Figure 1:
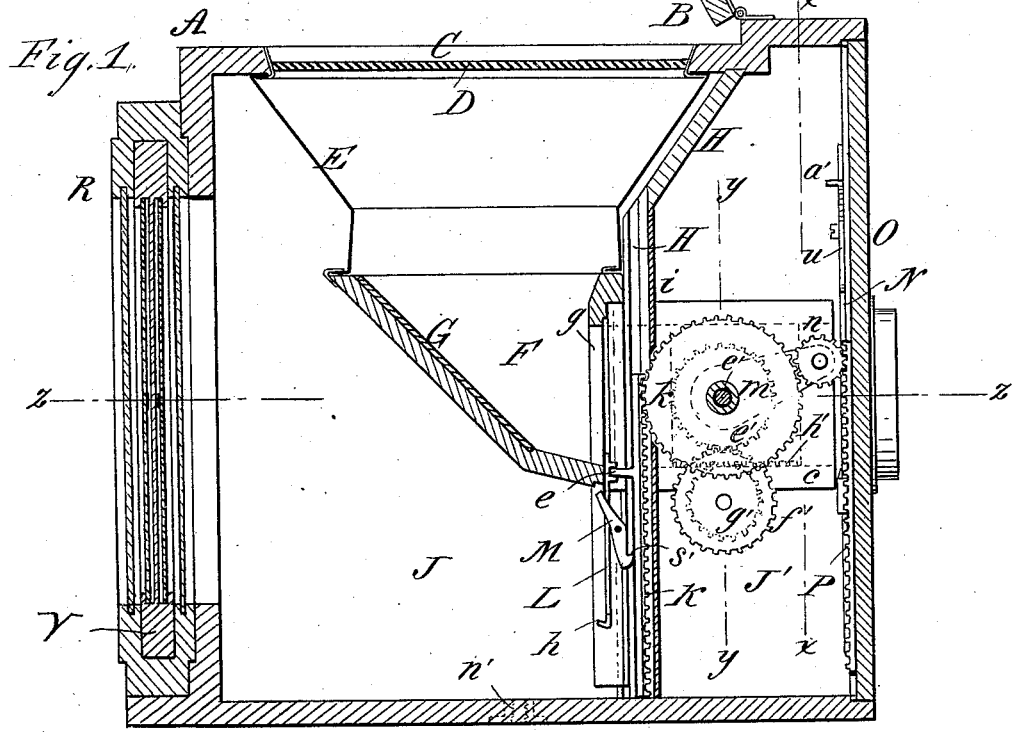

(No Model.) 2 Sheets—Sheet 1.

W. CLARK.
PHOTOGRAPHIC CAMERA.

No. 304,503. Patented Sept. 2, 1884.

WITNESSES:
A. Lurcott
C. Sedgwick

INVENTOR:
W. Clark
BY Munn & Co
ATTORNEYS.

(No Model.) 2 Sheets—Sheet 2.

W. CLARK.
PHOTOGRAPHIC CAMERA.

No. 304,503. Patented Sept. 2, 1884.

WITNESSES:
A. Lurcott
C. Sedgwick

INVENTOR:
W. Clark
BY Munn & Co
ATTORNEYS.

UNITED STATES PATENT OFFICE.

WALTER CLARK, OF NEW YORK, N. Y.

PHOTOGRAPHIC CAMERA.

SPECIFICATION forming part of Letters Patent No. 304,503, dated September 2, 1884.

Application filed January 17, 1884. (No model.)

*To all whom it may concern:*

Be it known that I, WALTER CLARK, of the city, county, and State of New York, have invented certain new and useful Improvements in Photographic Cameras, of which the following is a full, clear, and exact description.

This invention more particularly relates to photographic cameras in which the following elements are combined, namely: an adjustable lens, a device for holding and exposing the sensitive plate at the back of the lens, a focusing-glass in the top or side of the camera-box, and a reflector for throwing the image upon the focusing-glass, whereby, among other advantages, certain of the usual manipulations are dispensed with, time is saved, the object to be photographed is presented upon the focusing-glass in an upright instead of in an inverted position, and the holder of the sensitive plate may remain in its place back of the lens while focusing on the ground glass or transparency; also, said glass does not require to be removed or disturbed to take the picture upon the sensitive plate. In such cameras the reflector above referred to is made adjustable into or out of line with the lens for the purpose of throwing the image upon the focusing-glass, and of afterward exposing the sensitive plate; and in this invention, as in another invention of mine, it is preferred to construct the camera-box with compartments, one of which, carrying the reflector, is constructed with an open side next to the lens, and is or may be composed in part of a bellows attachment to provide for its adjustment in or out of connection with the lens, and has combined with it a movable intercepting-diaphragm between it and the lens, while the other compartment serves for exposure of the sensitive plate.

The invention consists in providing such or other like cameras with a partition in front of the adjustable reflector and compartment or chamber in which the sensitive plate is exposed, thus dividing the box into two sections or stationary compartments, whereby provision is made for inclosing the lens-case and working mechanism within the box, thereby doing away with objectionable outside exposure of parts; and the invention, furthermore, consists in certain constructions and combinations of the operating mechanism and the devices actuated by it, whereby great convenience and efficiency are secured, all as hereinafter fully described, and pointed out in the claims.

Reference is to be had to the accompanying drawings, forming part of this specification, in which similar letters of reference indicate corresponding parts in all the figures.

Figure 2:
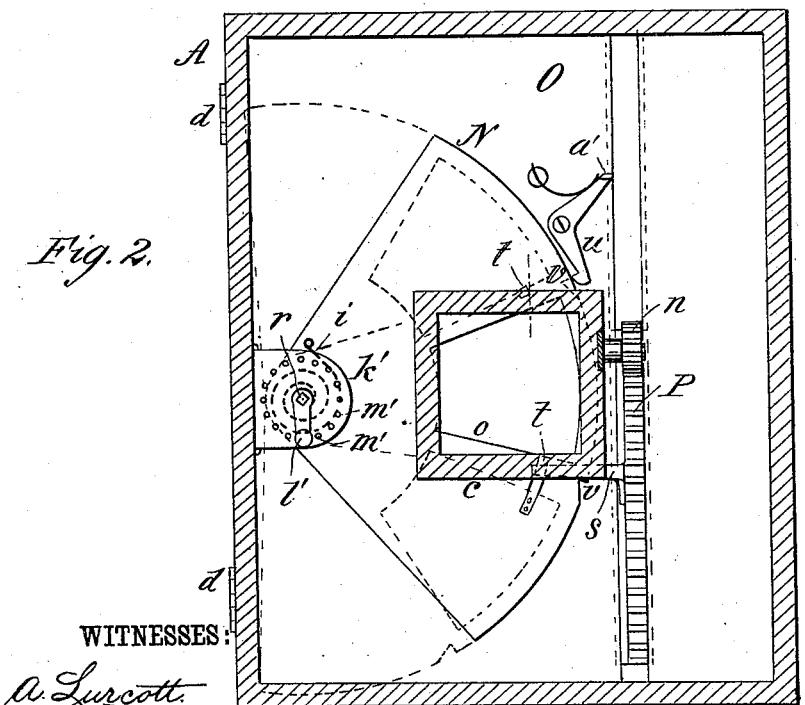
Figure 3:
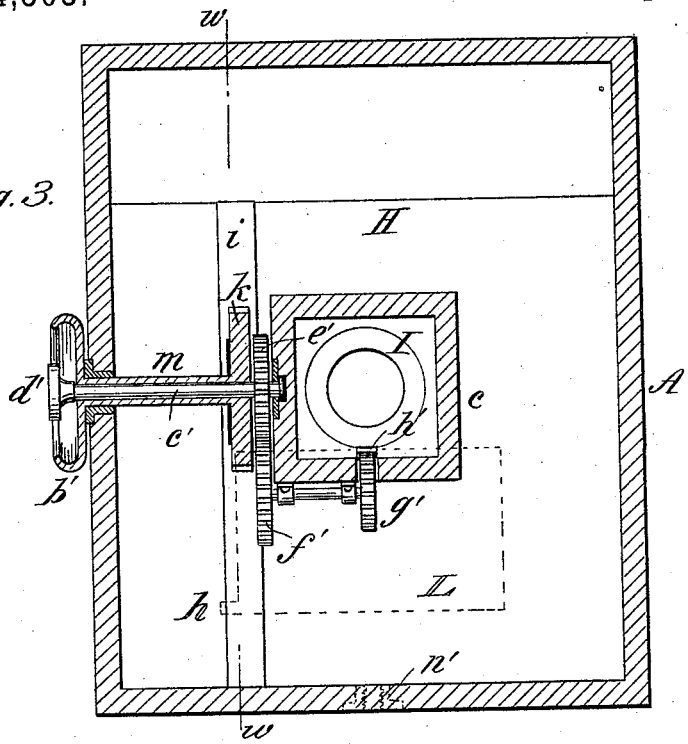
Figures 4, 5:
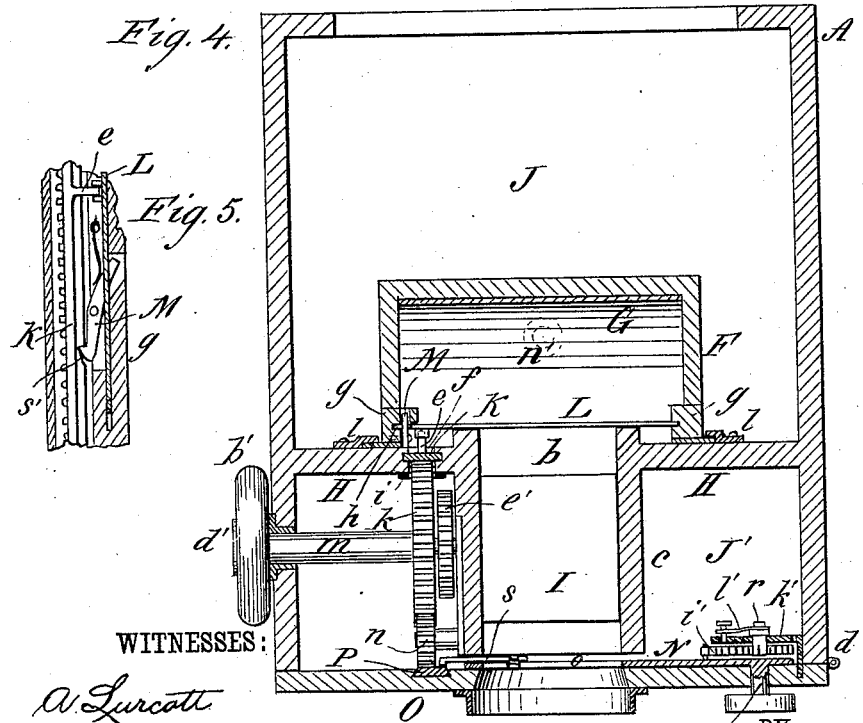
Figure 6:
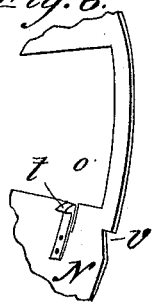

Figure 1 represents a vertical longitudinal section, mainly upon the line *w w* in Fig. 3, of a photographic camera embodying my invention; Fig. 2, a transverse vertical section upon the line *x x* in Fig. 1; Fig. 3, a further transverse section mainly upon the line *y y* in Fig. 1; and Fig. 4, a horizontal section mainly upon the line *z z* in Fig. 1. Fig. 5 is a sectional view of certain details detached, and Fig. 6 a side view of a vibrating drop or fly shutter in part.

A is the camera-box, provided with a hinged or other lid, B. In the top of the box A is an aperture, C, for reception of the ground-glass plate D, upon which the picture is focused. A bellows, E, is secured at its upper end to the box A, within or on the under side of the marginal portion of the aperture C, and is connected at its lower end to the upper end of the mirror box or case F. This case is constructed to incline upwardly on its back and away from the lens end of the camera, for the support thereon, at a proper angle relatively to the ground glass D, of a reflector or mirror, G. The top of the case F and the face of it opposite the reflector are both left open. Arranged in front of the open face of said case, at a suitable distance from the lens side or front of the camera, is a partition, H, extending across the box, and provided with a lens-opening, *b*, in it also, which may be constructed or provided with a horizontal trunk, *c*, for the adjustable lens-tube I in the space between said partition and the front of the box. The partition H, which thus serves to support the lens-case, instead of arranging it in front of the box, divides the box into two sections or stationary compartments, J J', and the mirror-case F may be said to constitute a third movable compartment, the compartment J serving for exposure of the sensitive plate. The front of the box is made to open and close, being hinged, as at $d$.

Let into the portion H, with provision for its moving up and down therein, and, if necessary, through a bent or angular upper part thereof, is a rack, K, having a finger, $e$, which projects back through a vertical slot, $f$, in the partition, and is fastened to a sliding diaphragm, L, arranged in front of the face of the mirror-case F, and working in grooves in side uprights, $g$, attached to the mirror-case. This diaphragm L in moving up closes the front opening in the case F. Upon said diaphragm is a projection, $h$, that in the upward movement of the diaphragm acts upon the back of a spring-catch, M, pivoted to the one mirror-case upright $g$, and engaging with a notch, $s'$, in the partition H, to hold the mirror-case down until the diaphragm L has finished its intercepting action in the upstroke. So soon, however, as the projection $h$ on the diaphragm passes over the back of the catch M it releases the mirror-case F, and said case, by the continued lifting action of the finger $e$, is raised, together with the diaphragm, to the top of the box, flexing the bellows E. The rack K, by which this movement is effected, is covered in front by a thin strip of metal, $i$, excepting where the gear-wheel $k$, which operates said rack, engages with the rack, thus excluding light to interfere with the taking of the picture. The two guides $l\,l$, in which the mirror-case moves, are fastened to the partition H. The large wheel $k$, which operates the rack K, diaphragm L, and mirror-case F, is fast on a sleeve, $m$, and engages on the opposite side of its axis with a pinion, $n$. This pinion $n$ forms part of the mechanism for operating the drop or fly shutter N, which is here shown as a vibratory one of sector shape, with an aperture, $o$, through it, and arranged on the inner side of the opening front O of the box A, the same having a pivot or working center, $r^2$, in said front, which has let into it a sliding rack, P, for operating the shutter by the pinion $n$. Upon this rack P is a finger, $s$, which engages with a spring catch or lifter, $t$, on the shutter, and moves the shutter up to the position shown for it by upper dotted lines in Fig. 2, when said finger will clear the lifter $t$; but the shutter thus lifted is retained in its elevated lens-closing position by a spring-catch, $u$, engaging with a notch, $v$, in the outer curved portion of the shutter. To secure the above-named release of the rack-finger $s$ from the shutter and its engagement with the lifter $t$ when the shutter is down, the shutter-pivot $r^2$ has its center arranged slightly below the center line of the camera or its lens-tube. After the shutter N has been raised and locked, as described, the rack P, in its continued upward movement, subsequently causes its finger $s$ to act upon a projecting heel end, $a'$, of the catch $u$ to release the shutter, which in dropping makes an exposure. The rotating sleeve $m$, which works the gears that operate the racks K P, passes out through the side of the box A, and is manipulated by a finger-wheel, $b'$, to raise the shutter and open the lens, and to give the necessary upward movement to the diaphragm L and mirror-case F.

Concentric with and passing through the sleeve $m$ is a spindle, $c'$, operated by a finger-wheel, $d'$, and having on its inner end a wheel, $e'$, which engages with a wheel, $f'$, carrying on its spindle a pinion, $g'$, which gears with a rack, $h'$, on the lens tube or case to adjust the lens as required.

The vibratory shutter N is represented as controlled or thrown by a coiled spring, $i'$, fast at its one end to the shutter, and at its other end to a pivot, $r$, in concentric relation with the pivot $r^2$ of the shutter, said pivot being fitted to turn in a bracket or plate, $k'$, on the inner side of the front, O, of the box, and having on it a spring-arm, $l'$, which is constructed to engage with any one of a series of apertures, $m'$, in the plate $k'$ to adjust the tension of the spring $i'$, for the purpose of regulating the working velocity of the shutter to give a longer or shorter exposure, or for otherwise regulating the spring as required.

The entire camera may rest upon any suitable support, or be carried by a post or upright arranged to fit a screw-socket, $n'$, in the base of the box, there being no exterior exposure of its operating mechanism to interfere with the placing or supporting of it.

In the use of the instrument the lid B is first raised, and the sleeve $m$ turned by the finger-wheel $b'$ to lower the mirror-case F and bring it into focusing position with the lens of the adjustable lens case or tube. The mirror-case having been lowered into focusing position, as described, and the shutter N adjusted by hand applied to a button on the outer end of its pivot $r^2$, to uncover the lens or to bring its aperture $o$ in line therewith, the picture is then focused on the ground glass D. Prior to this, or so soon as the mirror-case has been lowered into focusing position, the slide of the plate-holder R may be withdrawn to prepare the camera for taking the picture on the sensitive plate. After the picture has been focused on the ground glass D the sleeve $m$ is turned to first raise the diaphragm L into its intercepting position, and then the mirror-case and its diaphragm out of the way; also, to lift the shutter N till the spring-catch $u$ engages with the notch $v$, to hold the shutter in its elevated closed position, after which, or during the concluding portion of the upstroke of the rack P, said catch is released, and the shutter drops or is thrown down by its spring $i$, and as the shutter falls or the aperture in it passes the lens-opening the picture is taken on the sensitive plate, the holder V containing which may then be removed. After this, the apparatus may be adjusted to repeat the operation as before. By the shutter N being raised immediately after focusing, the lens-opening is closed to prevent light from entering therethrough till after the further raising of rack P and subsequent fall of the drop when taking the picture. It should also be observed that the diaphragm L in being raised to close the mirror-case F before said case is lifted, and keeping the case closed till after the picture is taken, light is excluded from entering by the ground glass D and through the mirror-case into the compartment J of the box in which the sensitive plate is exposed.

The plate-holder V may be of the usual or any suitable construction, and the drop-shutter and mirror-case may be variously modified and the mirror and focusing-glass be arranged to focus on the side instead of on the top of the camera-box.

By means of the partition H and arrangement of the working mechanism within the box, including the lens tube or case, not only is there great compactness, but the mechanism is protected from injury, or from interfering by outside exposure with the handling and placing of the camera, and the mechanism employed is both simple and efficient and is readily accessible on opening the front lid, O, of the box.

In an application filed by me August 8, 1883, Serial No. 103,109, a movable diaphragm, a movable mirror-case, and a bellows attached to said case and around the opening in the camera-box carrying the focusing-glass, are described and claimed, and form no part of the present invention.

Having thus described my invention, what I claim as new, and desire to secure by Letters Patent, is—

1. In a photographic camera in which are combined an adjustable lens, a device for holding and exposing the sensitive plate at the back of the lens, a focusing-glass in the side or top of the camera-box, and a reflector for throwing the image upon the focusing-glass, the camera-box constructed with a stationary partition in advance of the reflector dividing the box into front and rear compartments, and serving to carry the lens tube or case, substantially as specified.

2. The camera-box provided with a partition dividing it into front and rear compartments and having a lens-opening through it, in combination with a movable mirror-case arranged at the back of said partition, and a focusing-glass in the top or side of the box, essentially as and for the purposes herein set forth.

3. The camera-box constructed with front and rear compartments, J J', and having a lens-opening between them, in combination with the movable inclined mirror-case F, arranged at the back of the front one, J', of said compartments, and provided with an opening and closing diaphragm, L, in its front, substantially as specified.

4. The combination, with the movable mirror-case F and its opening and closing diaphragm L, constructed to lift said case after closing it, of the sliding rack K, connected with said diaphragm, and the catch M, essentially as described.

5. The combination, with the camera-box compartments J J', the movable mirror-case F, having an opening and closing diaphragm, L, and the drop-shutter of the camera, of mechanism arranged within the forward compartment, J', for operating said case, diaphragm, and shutter, substantially as specified.

6. The combination, with the partition H, dividing the camera-box into front and rear compartments, J J', of the rack K, fitted to slide in or on said partition, the gear-wheel $k$, operating said rack, and the mirror-case F and its opening and closing diaphragm L, moved by said rack, essentially as described.

7. The sleeve $m$ and spindle $c'$, arranged for operation from the exterior of the box, in combination with the gears $k$ $n$ $e'$ $f'$ $g'$ and the racks K, P, and $h'$ within the box, the movable mirror-case F, its opening and closing diaphragm L, the shutter N, and the adjustable lens of the camera, substantially as specified.

8. The circularly-shaped vibratory shutter N, having a notch, $v$, in combination with the spring-catch $u$, the spring catch or lifter $t$, and the rack P, with its finger $s$, substantially as described.

9. The vibratory drop-shutter N, in combination with its controlling-spring $i$, spring-arm $l'$, and bracket or plate $k'$, essentially as and for the purpose described.

WALTER CLARK.

Witnesses:
EDGAR TATE,
EDWARD M. CLARK.